(12) United States Patent
Takahashi

(10) Patent No.: US 9,268,133 B2
(45) Date of Patent: Feb. 23, 2016

(54) OPTICAL SCANNING APPARATUS AND SCANNING MICROSCOPE APPARATUS

(71) Applicant: OLYMPUS CORPORATION, Tokyo (JP)

(72) Inventor: Shintaro Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 102 days.

(21) Appl. No.: 14/279,950

(22) Filed: May 16, 2014

(65) Prior Publication Data

US 2014/0246560 A1    Sep. 4, 2014

Related U.S. Application Data

(63) Continuation of application No. PCT/JP2012/080510, filed on Nov. 26, 2012.

(30) Foreign Application Priority Data

Nov. 28, 2011  (JP) ................................. 2011-259278

(51) Int. Cl.
  *G02B 26/10*  (2006.01)
  *G02B 21/00*  (2006.01)
(52) U.S. Cl.
  CPC ............ *G02B 26/105* (2013.01); *G02B 21/002* (2013.01); *G02B 26/101* (2013.01)
(58) Field of Classification Search
  CPC ... G02B 26/105; G02B 26/101; G02B 21/002
  USPC .......................... 250/201.3; 359/201.2, 212.1
  See application file for complete search history.

(56) References Cited

U.S. PATENT DOCUMENTS 4,893,008 A    1/1990  Horikawa
5,691,839 A   11/1997  Kobayashi
(Continued)

FOREIGN PATENT DOCUMENTS

JP    63-306413 A    12/1988
JP    05-173085 A     7/1993
(Continued)

OTHER PUBLICATIONS

International Search Report dated Feb. 26, 2013 issued in PCT/JP2012/080510.

*Primary Examiner* — Seung C Sohn
(74) *Attorney, Agent, or Firm* — Scully, Scott, Murphy & Presser, PC

(57) ABSTRACT

Provided is an optical scanning apparatus including: a deflector capable of deflecting an entering beam while switching an advancing direction thereof among a plurality of direction at a predetermined switching timing; a mirror array including a plurality of angle setting mirrors that are placed at angles different from one another on respective optical paths of the beams deflected by the deflector, each of the angle setting mirrors reflecting the beam while giving thereto a relative angle on the same plane for each optical path, and gathering the beam on the same point; and a first scanner that is provided so as to be swingable about an axial line perpendicular to the plane in synchronization with the switching timing, the first scanner reflecting each beam that is caused by the mirror array to enter the same point from a different direction and applying for scanning the beam along the same trajectory.

7 Claims, 8 Drawing Sheets

(56) References Cited

U.S. PATENT DOCUMENTS

| | | |
|---|---|---|
| 5,936,764 A | 8/1999 | Kobayashi |
| 6,037,967 A | 3/2000 | Allen et al. |
| 6,396,053 B1 | 5/2002 | Yokoi |
| 2004/0125428 A1* | 7/2004 | Kobayashi ........... G02B 26/105 359/221.1 |
| 2006/0071143 A1 | 4/2006 | Saggau et al. |
| 2009/0021801 A1* | 1/2009 | Ishihara ................ G02B 27/48 358/475 |
| 2011/0317228 A1* | 12/2011 | Matsuo .................. H04N 1/047 358/480 |
| 2012/0271111 A1* | 10/2012 | Namiki ................ G02B 27/283 600/163 |

FOREIGN PATENT DOCUMENTS

| | | |
|---|---|---|
| JP | 06-300974 A | 10/1994 |
| JP | 2000-199855 A | 7/2000 |
| JP | 2004-361201 A | 12/2004 |
| JP | 2006-162994 A | 6/2006 |

* cited by examiner

OPTICAL SCANNING APPARATUS AND SCANNING MICROSCOPE APPARATUS

CROSS-REFERENCE TO RELATED APPLICATIONS

This is a continuation of International Application PCT/JP2012/080510, with an international filing date of Nov. 26, 2012, which is hereby incorporated by reference herein in its entirety.

This application is based on Japanese Patent Application No. 2011-259278, the contents of which are incorporated herein by reference.

TECHNICAL FIELD

The present invention relates to an optical scanning apparatus and a scanning microscope apparatus.

BACKGROUND ART

Up to now, optical scanning apparatuses that can increase a practical scanning speed of a laser beam have been known (see, for example, PTL 1). An optical scanning apparatus described in PTL 1 includes: a beam splitter that reflects a laser beam, allows the laser beam to be transmitted therethrough, and branches the laser beam into a plurality of light fluxes; a half mirror that reflects the laser beams transmitted through the beam splitter; a scanner that applies for scanning the laser beams that are reflected on the beam splitter and the half mirror at different exit angles and are gathered on the same point; and a diaphragm that selectively allows the laser beams applied for scanning by the scanner to pass therethrough.

In the optical scanning apparatus described in PTL 1, the laser beams reflected on the beam splitter and the half mirror are simultaneously applied for scanning by the scanner, and only any of the laser beams is sequentially allowed to pass through the diaphragm. Consequently, during one swing of the scanner, the plurality of laser beams are sequentially applied for scanning while the irradiation range is shifted, so that the time required to scan a given area is shortened.

CITATION LIST

Patent Literature

{PTL 1}
Japanese Unexamined Patent Application, Publication No. Hei 5-173085

SUMMARY OF INVENTION

Technical Problem

The present invention provides an optical scanning apparatus and a scanning microscope apparatus that can increase the scanning speed without decreasing the light use efficiency.

Solution to Problem

The present invention provides the following solutions.

According to a first aspect of the present invention, an optical scanning apparatus includes: a deflector capable of deflecting an entering laser beam while switching an advancing direction thereof among a plurality of direction at a predetermined switching timing; an angle setting unit including a plurality of angle setting mirrors that are placed at angles different from one another on respective optical paths of the laser beams deflected by the deflector, each of the angle setting mirrors reflecting the laser beam while giving thereto a relative angle on the same plane for each optical path, and gathering the laser beam on the same point; and a swingable mirror that is provided so as to be swingable about an axial line perpendicular to the plane in synchronization with the switching timing, the swingable mirror reflecting each laser beam that is caused by the angle setting unit to enter the same point from a different direction and applying for scanning the laser beam along the same trajectory.

According to a second aspect of the present invention, a scanning microscope apparatus includes: the optical scanning apparatus having any of the above-mentioned features; an observation optical system that irradiates a sample with the laser beam applied for scanning by the optical scanning apparatus; and a detection unit that detects light from the sample that is irradiated with the laser beam by the observation optical system.

BRIEF DESCRIPTION OF DRAWINGS

FIG. 1(a) is a schematic view illustrating an optical scanning apparatus according to a first embodiment of the present invention,
and FIG. 1(b) is a schematic view illustrating a beam in a first optical path that is applied for scanning by a scanner of FIG. 1(a).

FIG. 2(a) is another schematic view illustrating the optical scanning apparatus according to the first embodiment of the present invention,
and FIG. 2(b) is a schematic view Illustrating a beam in a fourth optical path that is applied for scanning by the scanner of FIG. 2(a).

FIG. 3 is a schematic view illustrating the state where a one-power angle setting mirror group of an optical scanning apparatus according to a first modification of the first embodiment of the present invention is inserted.

FIG. 4 is a schematic view illustrating the state where a two-power angle setting mirror group of the optical scanning apparatus according to the first modification of the first embodiment of the present invention is inserted.

FIG. 5 is a schematic view illustrating the state where a four-power angle setting mirror group of the optical scanning apparatus according to the first modification of the first embodiment of the present invention is inserted.

FIG. 6 is a schematic view illustrating the state where an angle setting mirror group of an optical scanning apparatus according to a second modification of the first embodiment of the present invention is placed close to the scanner.

FIG. 7 is a schematic view illustrating the state where the angle setting mirror group of the optical scanning apparatus according to the second modification of the first embodiment of the present invention is placed away from the scanner.

FIG. 8 is a schematic view illustrating a scanning microscope apparatus according to a second embodiment of the present invention.

DESCRIPTION OF EMBODIMENTS (First Embodiment)

An optical scanning apparatus according to a first embodiment of the present invention is described below with reference to the drawings.

Figure 1:
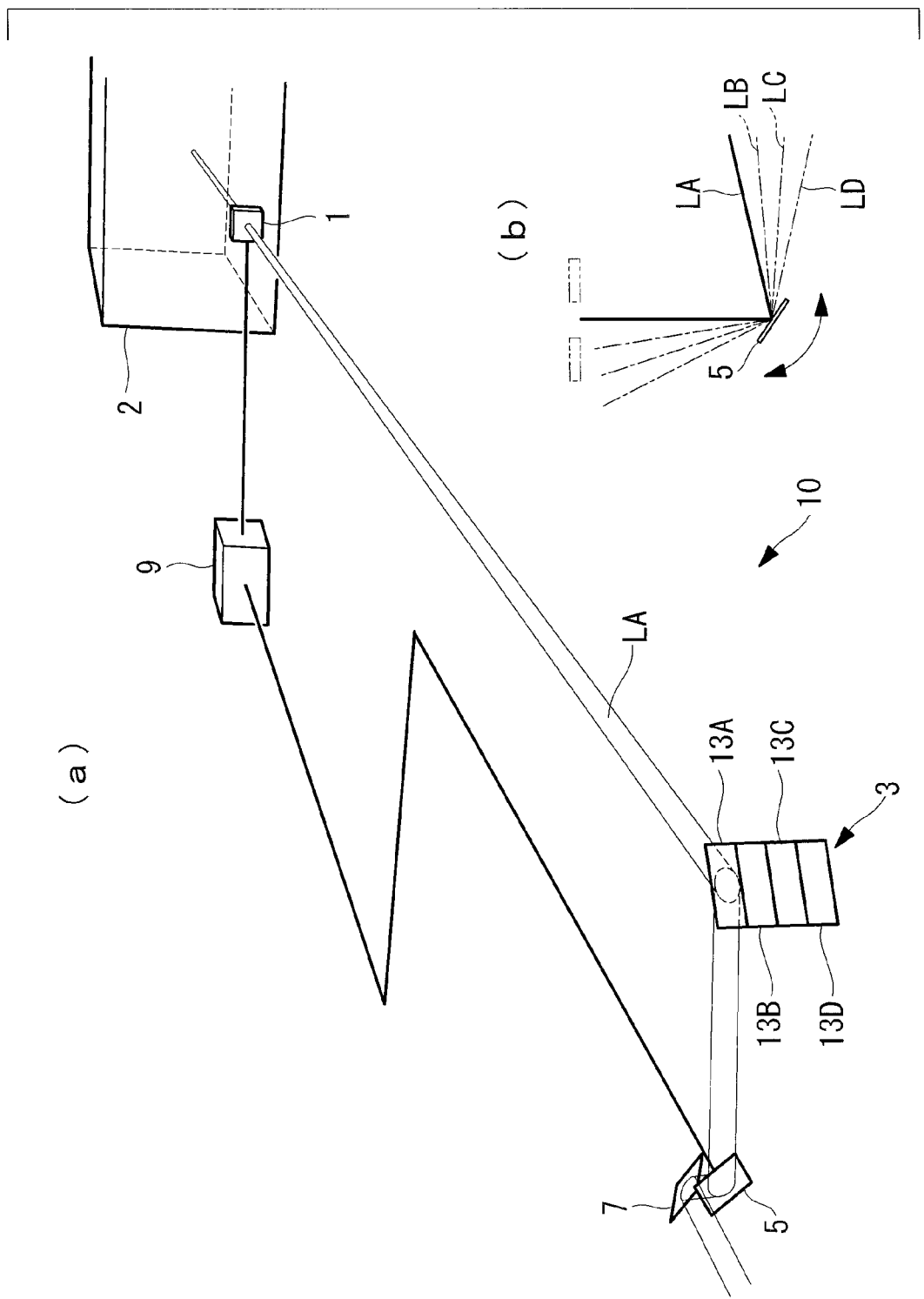
{FIG. 1}
Figure 2:
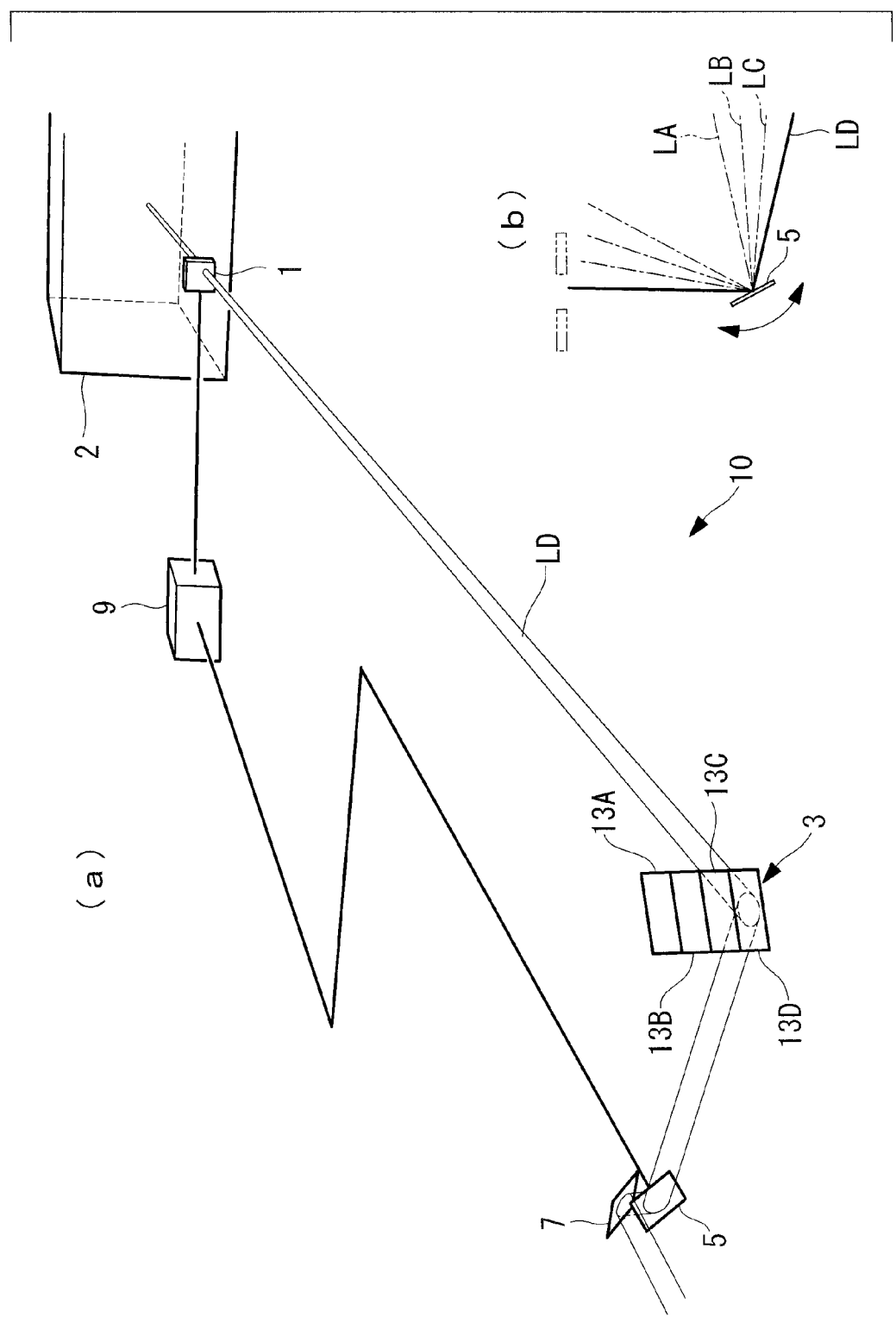
{FIG. 2}

As illustrated in FIG. 1(a) and FIG. 2(a), an optical scanning apparatus 10 according to the present embodiment includes: a deflector 1 that switches the advancing direction of a beam (laser beam) emitted from a light source 2; a mirror array (angle setting unit) 3 that reflects the beam deflected by the deflector 1; a first scanner (swingable mirror) 5 and a second scanner (another swingable mirror) 7 such as galvano mirrors that apply for scanning the beam reflected on the mirror array 3; and a control unit 9 that controls the deflector 1, the first scanner 5, and the second scanner 7.

The deflector 1 can deflect the beam that enters the deflector 1 from the light source 2 while one-dimensionally switching the advancing direction thereof among a plurality of directions at a predetermined switching timing. In the present embodiment, the deflector 1 one-dimensionally switches the advancing direction of the beam among four directions. As illustrated in FIG. 1(b) and FIG. 2(b), the respective optical paths of the beams deflected by the deflector 1 are hereinafter defined in order as a first optical path LA, a second optical path LB, a third optical path LC, and a fourth optical path LD. FIG. 1(a) illustrates the beam passing through the first optical path LA, and FIG. 2(a) illustrates the beam passing through the fourth optical path LD. Moreover, FIG. 1(b) and FIG. 2(b) each illustrate beam scanning by the first scanner 5.

Moreover, the deflector 1 can switch the beam deflecting direction at high speed in order from the first optical path LA to the fourth optical path LD. For example, an acousto-optic deflector (AOD) and an electro-optic crystal can be used for the deflector 1.

The mirror array 3 includes a plurality of (in the present embodiment, four) angle setting mirrors 13A, 13B, 13C, and 13D arranged in one direction.

The angle setting mirrors 13A to 13D are respectively provided on the optical paths LA to LD of the beams deflected by the deflector 1, and are placed at angles different from one another. More specifically, the angle setting mirror 13A is placed on the first optical path LA, the angle setting mirror 13B is placed on the second optical path LB, the angle setting mirror 13C is placed on the third optical path LC, and the angle setting mirror 13D is placed on the fourth optical path LD.

The angle setting mirrors 13A to 13D are set so as to: reflect the beams that respectively enter the angle setting mirrors 13A to 13D along the optical paths LA to LD, while giving thereto relative angles on the same plane; and gather the beams on the same point of the first scanner 5.

The first scanner 5 is provided so as to swingable about an axial line that is perpendicular to the plane along the four optical paths LA to LD of the beams that enter the first scanner 5 from the mirror array 3. With this configuration, the first scanner 5 can reflect the beams that enter the same point at different angles on the same plane from the angle setting mirrors 13A to 13D of the mirror array 3, and can apply for scanning the beams along the same trajectory, that is, along the arrangement direction of the angle setting mirrors 13A to 13D. The beam scanning direction of the first scanner 5 is defined as an X direction.

The second scanner 7 is provided so as to swingable about an axial line that is orthogonal to the axial line of the first scanner 5. The second scanner 7 reflects each beam applied for scanning by the first scanner 5, and applies for scanning the beam in a direction orthogonal to the scanning direction of the first scanner 5, that is, a Y direction.

In response to an actuation of the control unit 9, the first scanner 5 and the second scanner 7 swing in synchronization with the switching timing of the direction of deflection by the deflector 1. With this configuration, the first scanner 5 and the second scanner 7 two-dimensionally apply for scanning the sequentially entering beams constantly to a given range on a sample in accordance with the switching timing of the direction of deflection by the deflector 1.

Next, an action of the optical scanning apparatus 10 according to the present embodiment is described.

When the optical scanning apparatus 10 according to the present embodiment applies for scanning a beam at high speed, first, the deflector 1 deflects the beam emitted from the light source 2 while switching the advancing direction thereof at high speed in order from the first optical path LA to the fourth optical path LD.

The beams that are deflected by the deflector 1 to the optical paths LA, LB, LC, and LD with high-speed switching sequentially enter the angle setting mirrors 13A, 13B, 13C, and 13D of the mirror array 3, respectively. Then, the angle setting mirrors 13A to 13D reflect the beams while giving thereto relative angles on the same plane, and cause the beams to sequentially enter the same point of the first scanner 5.

The beams that are caused to sequentially enter the same point of the first scanner 5 at different angles on the same plane along the optical paths LA to LD are sequentially applied for scanning in the X direction by the first scanner 5 swinging about the axial line, and are shifted in the Y direction by the second scanner 7 swinging about the axial line orthogonal thereto. In this way, the beams are two-dimensionally applied for scanning by the first scanner 5 and the second scanner 7.

In this case, in response to an actuation of the control unit 9, the first scanner 5 and the second scanner 7 are swung in synchronization with the switching timing of the direction of deflection by the deflector 1, whereby the beams that enter the first scanner 5 at entrance angles different from one another from the angle setting mirrors 13A to 13D are two-dimensionally sequentially applied for scanning to the same range with a time interval in accordance with the entrance angles of the beams to the first scanner 5 and the second scanner 7.

More specifically, as illustrated in FIGS. 1A and 1B, the beam that is deflected by the deflector 1 to the optical path LA is reflected on the angle setting mirror 13A of the mirror array 3, and is two-dimensionally applied for scanning to the given range on the sample (not illustrated) by the first scanner 5 and the second scanner 7. Similarly, as illustrated in FIGS. 2A and 2B, the beams that are deflected by the deflector 1 to the optical paths LB, LC, and LD are respectively reflected on the angle setting mirrors 13B, 13C, and 13D of the mirror array 3, enter the same points of the first scanner 5 and the second scanner 7, and are applied for scanning to the same range on the sample. In this way, the beams are two-dimensionally applied for scanning at high speed to the given range on the sample in accordance with the switching timing of the deflector 1. FIGS. 2A and 2B illustrate the beam that is deflected by the deflector 1 to the optical path LD.

With the above-mentioned optical scanning apparatus 10 according to the present embodiment, the first scanner 5 and the second scanner 7 apply for scanning each beam in synchronization with the switching timing of the direction of deflection by the deflector 1. Hence, if the deflector 1 simply switches the beam deflecting direction at high speed, it is possible to improve the scanning speed without decreasing the beam use efficiency, compared with the case where a beam splitter branches a beam into a plurality of optical paths and where only beams that pass through a diaphragm are used.

The present embodiment can be modified in the following manner.

Figure 3:
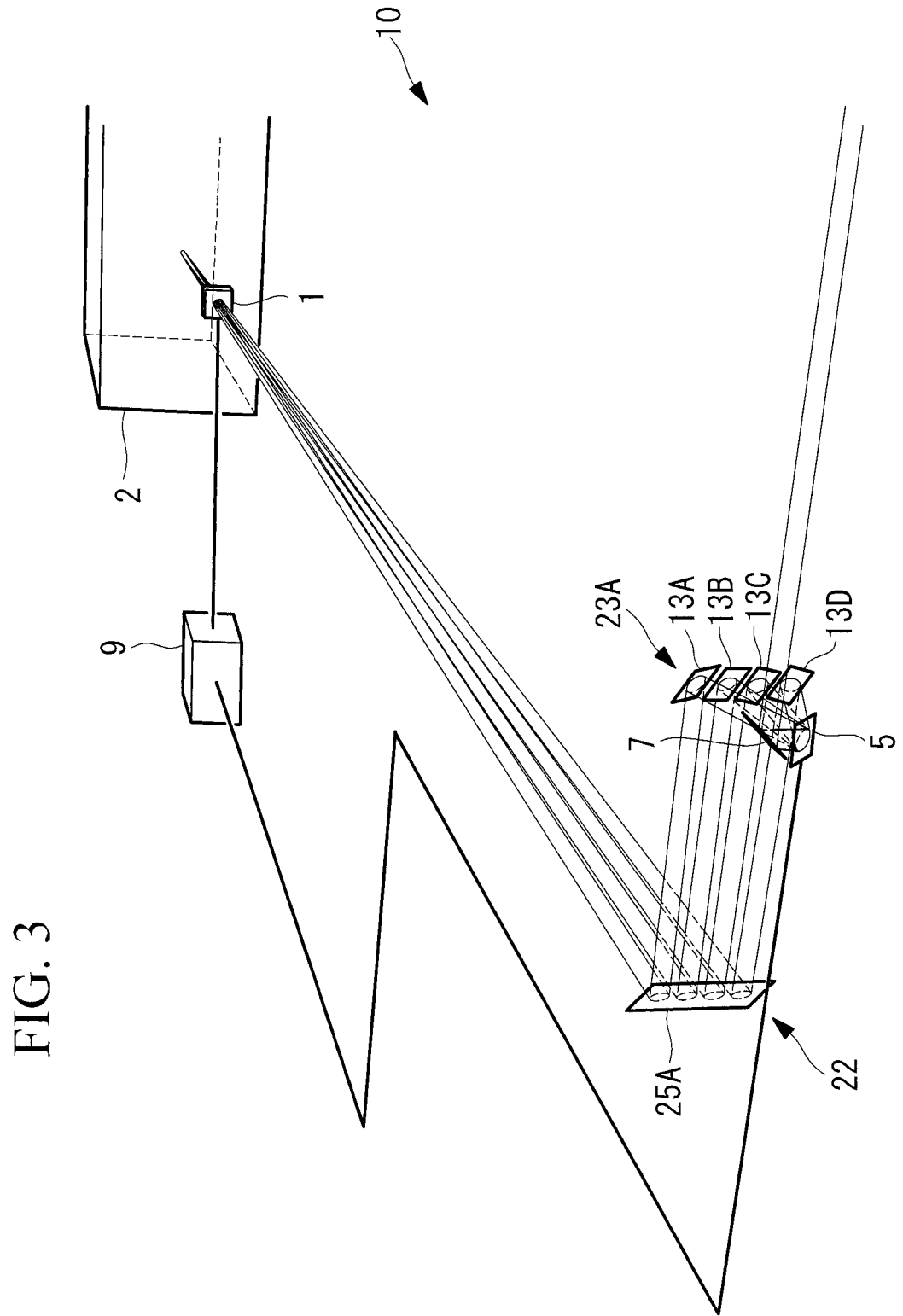
{FIG. 3}
Figure 4:
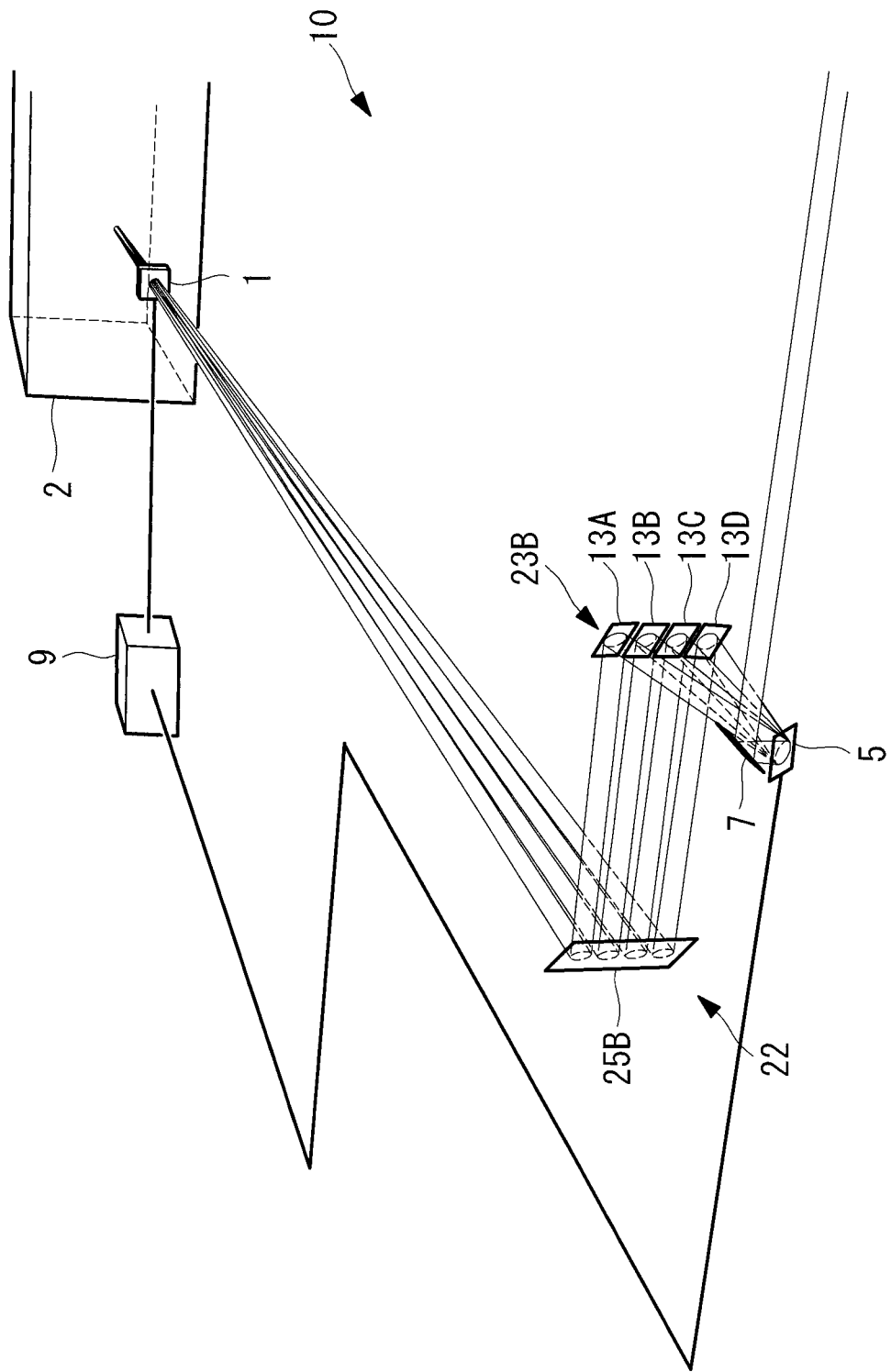
{FIG. 4}
Figure 5:
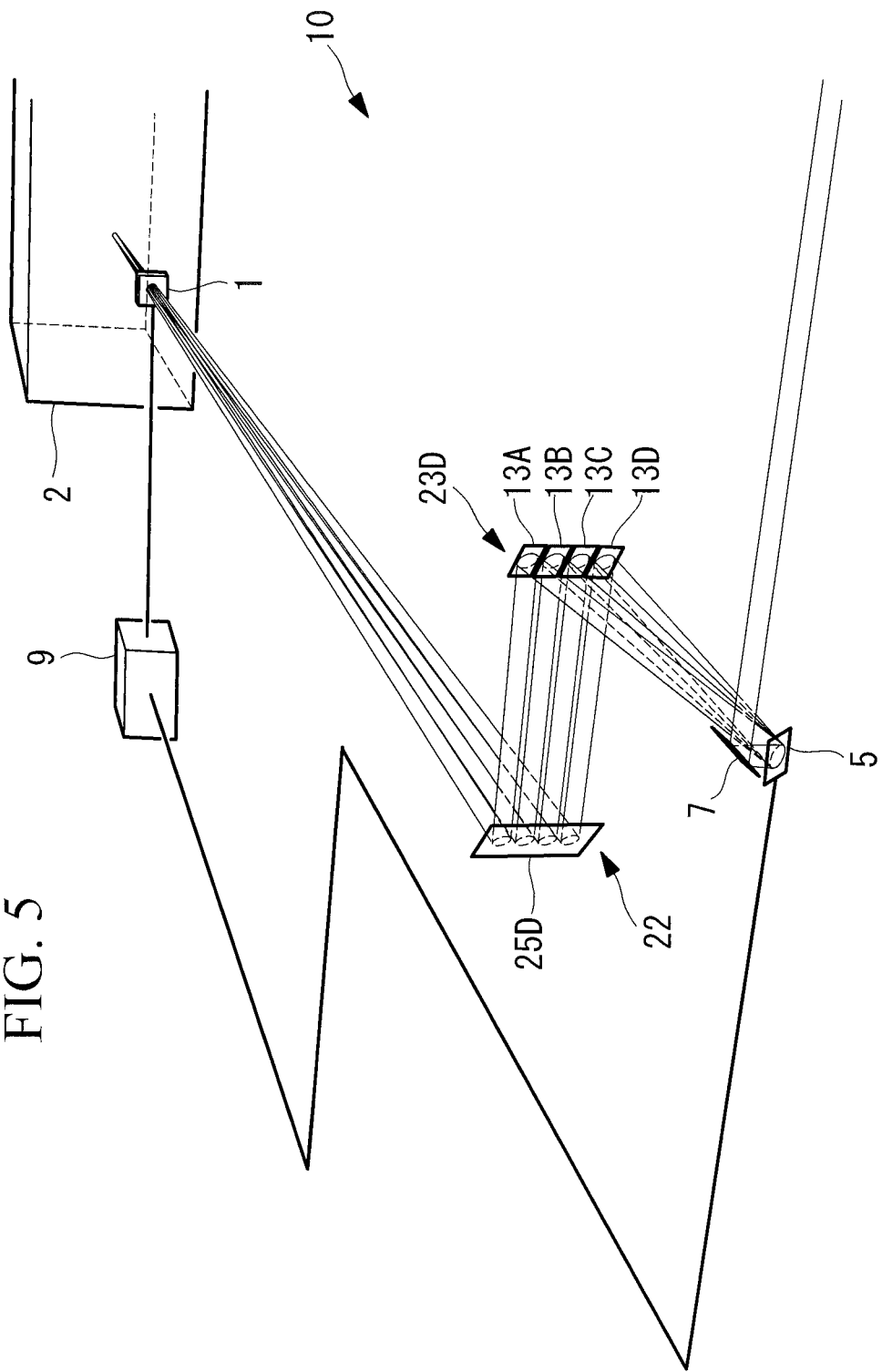
{FIG. 5}

In the present embodiment, the mirror array 3 including the plurality of angle setting mirrors 13 is described as an example angle setting unit. Alternatively, in a first modification, as illustrated in FIGS. 3 to 5, an angle setting unit 22 may include a plurality of pairs of: a plurality of angle setting mirror groups 23 in which angle settings of the four angle setting mirrors 13A to 13D are different from one another; and a plurality of reflecting mirrors 25A to 25D that reflect the beams deflected by the deflector 1 and cause the beams to respectively enter the angle setting mirrors 13A to 13D of each angle setting mirror group 23. In the present modification, for example, the angle setting unit 22 includes four pairs of the angle setting mirror groups 23 and the reflecting mirrors 25A to 25D.

In this case, for example, as illustrated in FIG. 3, a mirror group in which the inclination angles of the angle setting mirrors 13A to 13D are largest is defined as a one-power angle setting mirror group 23A. As illustrated in FIG. 4, a mirror group in which the inclination angles of the angle setting mirrors 13A to 13D are made slightly smaller is defined as a two-power angle setting mirror group 23B. A mirror group in which the inclination angles of the angle setting mirrors 13A to 13D are made further smaller is defined as a three-power angle setting mirror group (not illustrated). As illustrated in FIG. 5, a mirror group in which the inclination angles of the angle setting mirrors 13A to 13D are smallest is defined as a four-power angle setting mirror group 23D.

Moreover, the pairs of the angle setting mirror groups 23A to 23D and the reflecting mirrors 25A to 25D may be respectively provided at positions different in distance from the first scanner 5 so as to be selectively insertable/detachable such that the beams reflected on the angle setting mirrors 13A to 13D are gathered on the same point of the first scanner 5.

More specifically, the pair of the angle setting mirror group 23A and the reflecting mirror 25A is insertably/detachably provided at a position closest to the first scanner 5, the pair of the angle setting mirror group 23B and the reflecting mirror 25B is insertably/detachably provided at a position slightly away therefrom, the pair of the three-power angle setting mirror group and the reflecting mirror (not illustrated) is insertably/detachably provided at a position further away therefrom, and the pair of the angle setting mirror group 23D and the reflecting mirror 25D is insertably/detachably provided at a position most away therefrom.

With such a configuration, selectively inserted one of the pairs of the angle setting mirror groups 23A to 23D and the reflecting mirrors 25A to 25D is changed, whereby the entrance angles of the laser beams to the first scanner 5 and the second scanner 7 can be changed in accordance with the angles of the angle setting mirrors 13A to 13D.

Here, if the swing ranges of the first scanner 5 and the second scanner 7 are narrowed, the magnifying power on an image of the sample irradiated with the beams applied for scanning by the first scanner 5 and the second scanner 7 becomes higher (the image is zoomed). If the swing ranges of the first scanner 5 and the second scanner 7 are widened, the magnifying power on the image of the sample irradiated with the beams applied for scanning by the first scanner 5 and the second scanner 7 becomes lower.

For example, as illustrated in FIG. 3, if the swing ranges of the first scanner 5 and the second scanner 7 are most widened, an image of the sample at one-fold magnification can be acquired. In this case, because the pair of the angle setting mirror group 23A and the reflecting mirror 25A is inserted, the beams from the deflector 1 can be caused to enter the first scanner 5 and the second scanner 7 at entrance angles that are made largest so as to suit the swing angles of the first scanner 5 and the second scanner 7.

Similarly, as illustrated in FIG. 4, if the swing ranges of the first scanner 5 and the second scanner 7 are slightly narrowed, for example, an image of the sample at two-fold magnification can be acquired. In this case, because the pair of the angle setting mirror group 23B and the reflecting mirror 25B is inserted, the beams from the deflector 1 can be caused to enter the first scanner 5 and the second scanner 7 at entrance angles that are made slightly smaller so as to suit the swing angles of the first scanner 5 and the second scanner 7.

Similarly, if the swing ranges of the first scanner 5 and the second scanner 7 are further narrowed, for example, an image of the sample at three-fold magnification can be acquired. In this case, because the pair of the angle setting mirror group 23C and the reflecting mirror 25C is inserted, the beams from the deflector 1 can be caused to enter the first scanner 5 and the second scanner 7 at entrance angles that are made further smaller so as to suit the swing angles of the first scanner 5 and the second scanner 7.

Then, as illustrated in FIG. 5, if the swing ranges of the first scanner 5 and the second scanner 7 are most narrowed, for example, an image of the sample at four-fold magnification can be acquired. In this case, because the pair of the angle setting mirror group 23D and the reflecting mirror 25D is inserted, the beams from the deflector 1 can be caused to enter the first scanner 5 and the second scanner 7 at entrance angles that are made smallest so as to suit the swing angles of the first scanner 5 and the second scanner 7.

Accordingly, through a simple configuration in which selectively inserted one of the pairs of the angle setting mirror groups 23A to 23D and the reflecting mirrors 25A to 25D is simply changed so as to suit the swing angles of the first scanner 5 and the second scanner 7, a zoom function using the first scanner 5 and the second scanner 7 can be achieved without the need to change a normal beam deflecting operation of the deflector 1.

Figure 6:
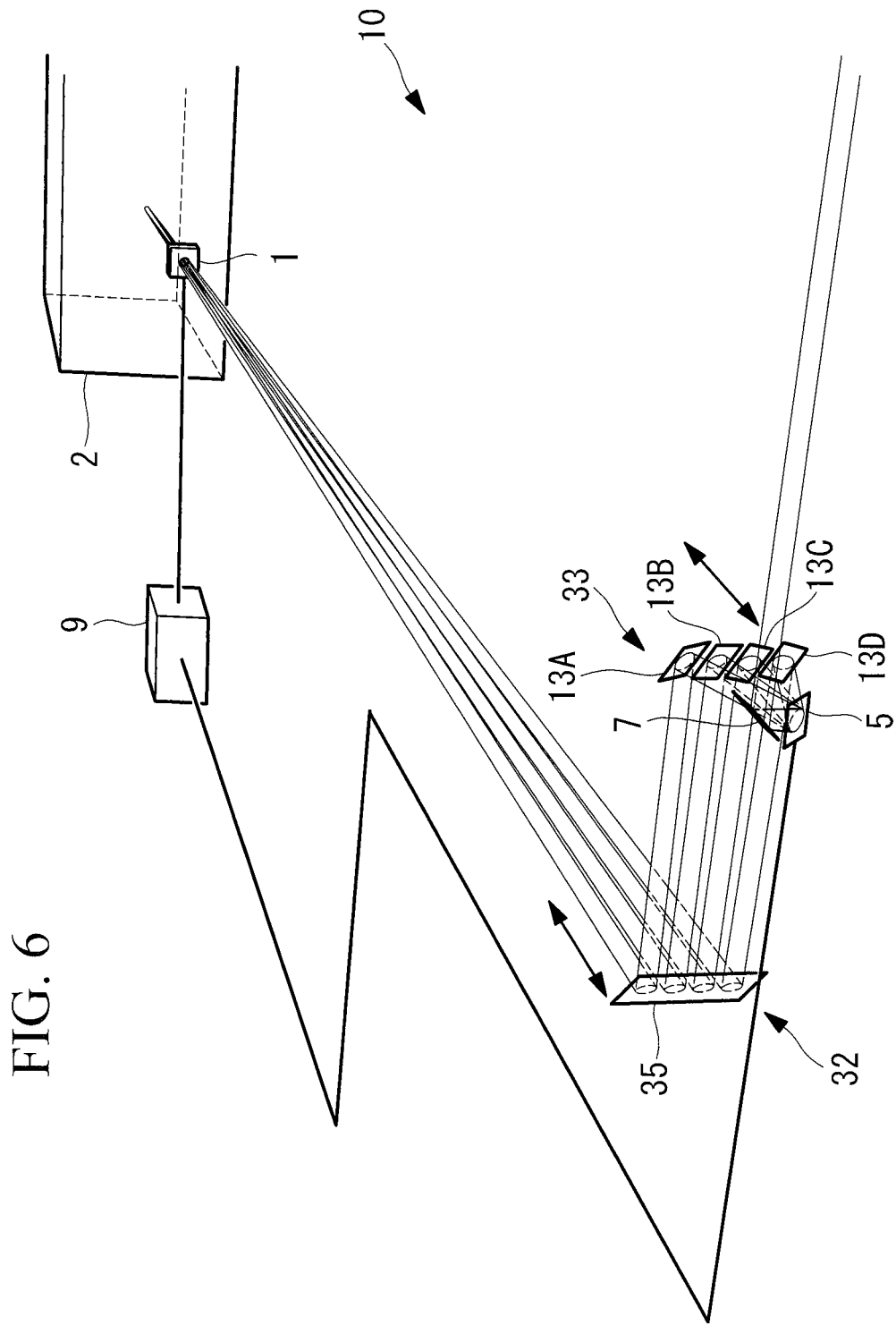
{FIG. 6}
Figure 7:
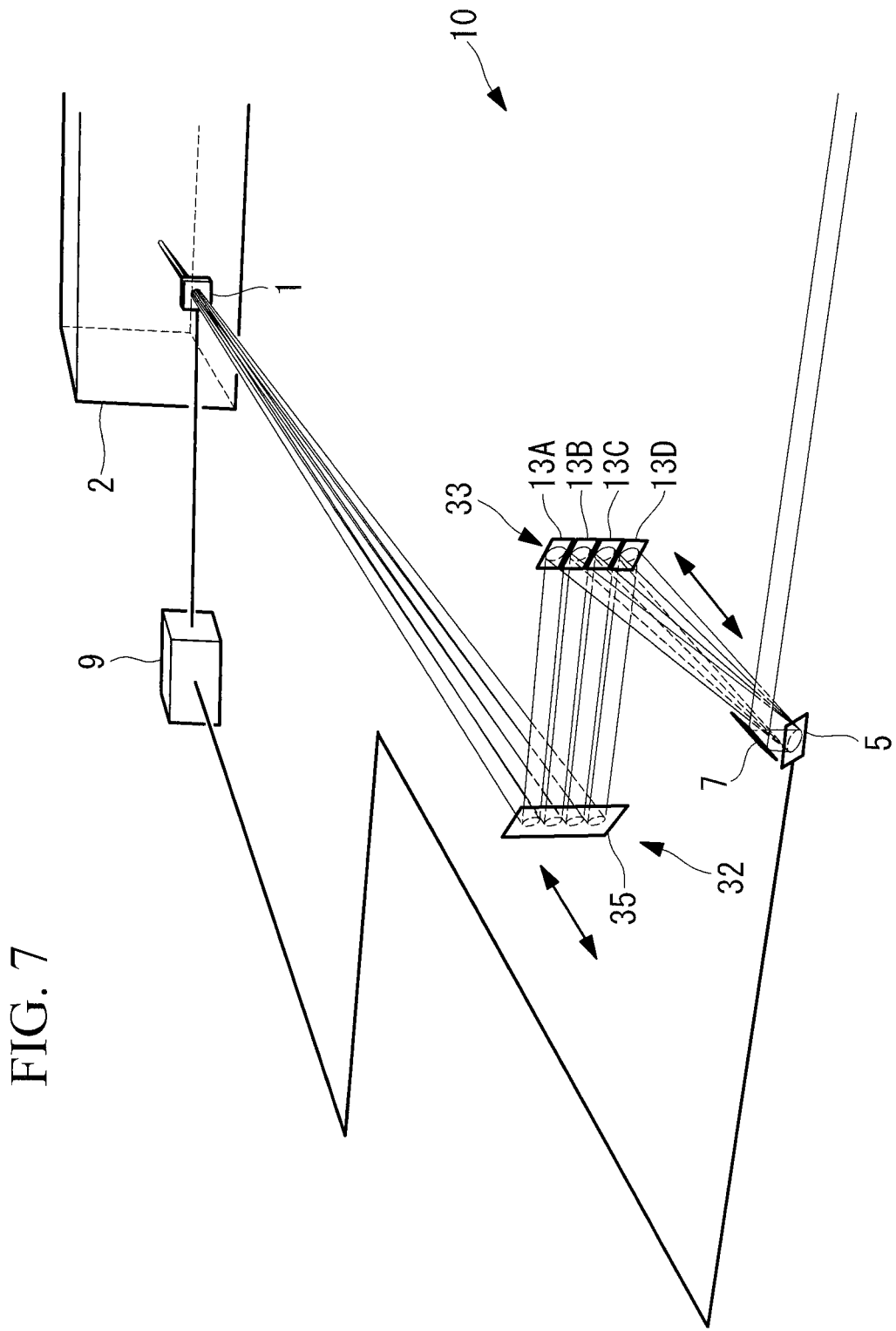
{FIG. 7}

In the first modification, the angle setting unit 22 includes the plurality of angle setting mirror groups 23A to 23D and the plurality of reflecting mirrors 25A to 25D. Alternatively, in a second modification, as illustrated in FIGS. 6 and 7, an angle setting unit 32 may include: one angle setting mirror group 33 including the plurality of angle setting mirrors 13; and one reflecting mirror 35 that reflects the beams deflected by the deflector 1 and causes the beams to respectively enter the angle setting mirrors 13A to 13D of the angle setting mirror group 33.

In this case, the angles of the angle setting mirrors 13A to 13D and the distances among the angle setting mirrors 13A to 13D may be manually or automatically changeable, and the angle setting mirror group 33 may be movable in the direction in which the angle setting mirrors 13A to 13D and the first scanner 5 come closer to or more away from each other.

Moreover, the reflecting mirror 35 may be provided on the optical paths of the beams deflected by the deflector 1 so as to be movable in the direction along the optical paths or swingable about another axial line parallel to the axial line of the first scanner 5.

With such a configuration, the angle setting mirror group 33 is moved in the direction in which the angle setting mirrors 13A to 13D and the first scanner 5 come closer to or more away from each other, and the angles of the angle setting mirrors 13A to 13D are adjusted such that the reflected beams are gathered on the same point of the first scanner 5 while relative angles on the same plane are given thereto for each optical path. As a result, the beams can be caused to enter the first scanner 5 and the second scanner 7 at entrance angles suited to the swing angles of the first scanner 5 and the second scanner 7. Accordingly, the magnifying power on an image of the sample can be varied by changing the swing angles of the first scanner 5 and the second scanner 7.

In this case, the reflecting mirror 35 is simply moved or swung so as to suit the position of the angle setting mirror group 33, whereby the beams from the deflector 1 can be caused to respectively enter the angle setting mirrors 13A to 13D of the angle setting mirror group 33. Accordingly, the zoom function using the first scanner 5 and the second scanner 7 can be easily achieved without the need to change the normal beam deflecting operation of the deflector 1.

For example, deformable mirrors may be used for the angle setting mirror group 33 according to the present modification.

In the present modification, the angle setting unit 32 includes the one movable angle setting mirror group 33. Alternatively, the angle setting unit may include the plurality of angle setting mirror groups 23A to 23D according to the first modification that are selectively insertable/detachable.

With such a configuration, the position or orientation of the reflecting mirror 35 is simply changed so as to suit the position of selectively inserted one of the angle setting mirror groups 23A to 23D, whereby the beams from the deflector 1 can be caused to enter the first scanner 5 at entrance angles suited to the swing angles of the first scanner 5 and the second scanner 7, via the reflecting mirror 35 and the selectively inserted one of the angle setting mirror groups 23A to 23D. Accordingly, the zoom function using the first scanner 5 and the second scanner 7 can be achieved without the need to change the normal beam deflecting operation of the deflector 1, while the number of components is reduced.

(Second Embodiment)

Figure 8:
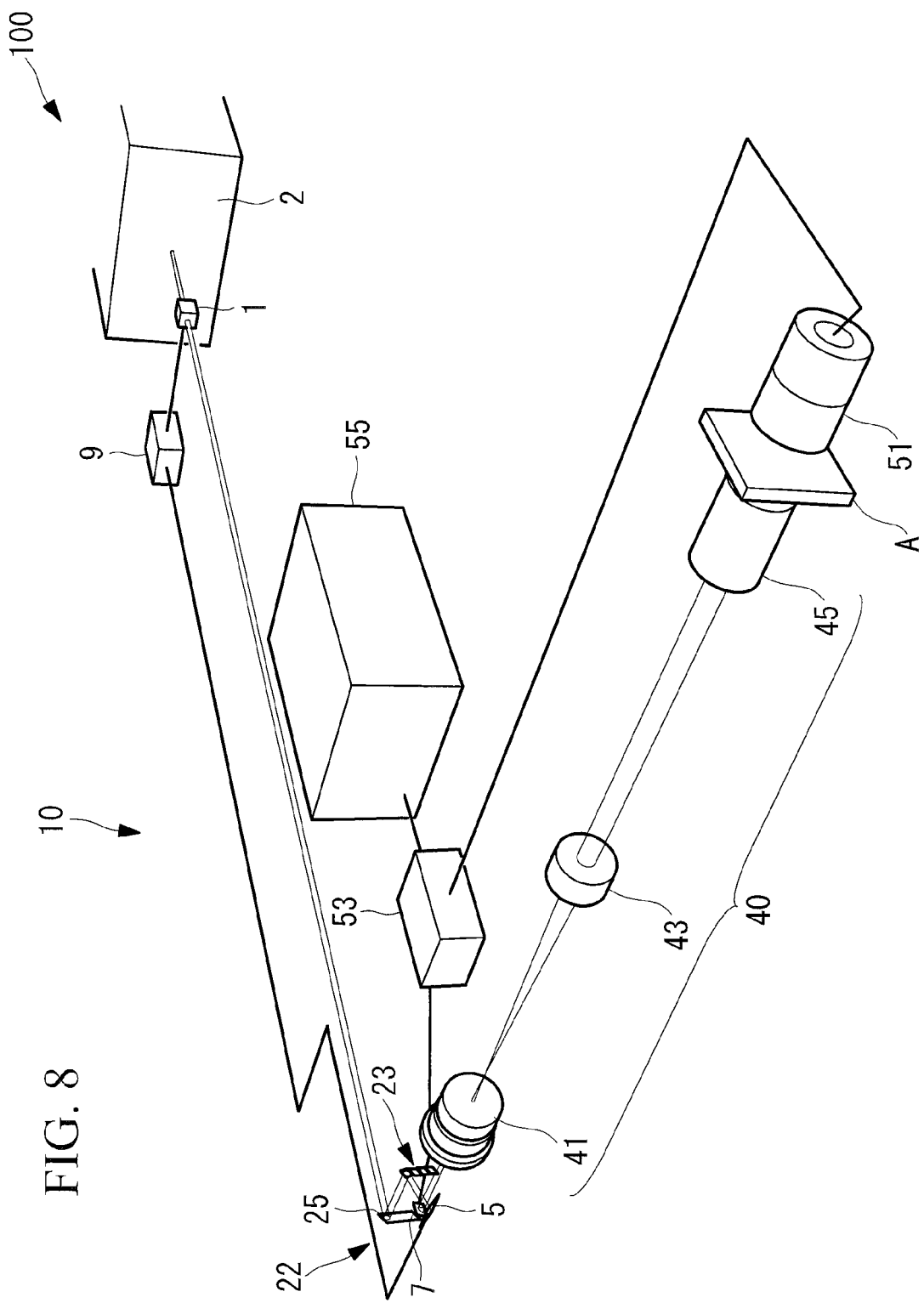
{FIG. 8}

Next, an optical scanning apparatus and a scanning microscope apparatus according to a second embodiment of the present invention are described with reference to FIG. 8.

A scanning microscope apparatus 100 according to the present embodiment includes: a light source 2; an optical scanning apparatus 10; a control unit 9; an observation optical system 40 that irradiates a sample A with a beam applied for scanning by the optical scanning apparatus 10; a detection unit 51 (such as a photodiode (PD) and a photomultiplier tube (PMT)) that detects light from the sample A that is irradiated with the beam by the observation optical system 40; a restoration unit 53 that restores an image of the sample A on the basis of the light detected by the detection unit 51; and a display unit 55 that displays the restored image.

Hereinafter, components common in configuration to those of the optical scanning apparatus 10 according to the first embodiment are denoted by the same reference signs, and description thereof is omitted.

The observation optical system 40 includes: a pupil projection lens 41 that relays the beam reflected on the second scanner 7; an imaging lens 43 that images the beam relayed by the pupil projection lens 41; and an objective lens 45 that irradiates the sample A with the beam imaged by the imaging lens 43.

The restoration unit 53 associates the light from the sample A detected by the detection unit 51 with the scanning position of the beam by the first scanner 5 and the second scanner 7, and restores an image of two-dimensional-information or three-dimensional information The display unit 55 displays the restored image of two-dimensional information or three-dimensional information, and may also be capable of converting various pieces of numerical data and image data detected by the detection unit 51 into desired display contents and displaying the resultant display contents.

Next, actions of the optical scanning apparatus 10 and the scanning microscope apparatus 100 configured as described above are described.

In order to observe the sample A using the scanning microscope apparatus 100 according to the present embodiment, first, in the optical scanning apparatus 10, the beam emitted from the light source 2 is deflected by the deflector 1 while the advancing direction thereof is switched in order at high speed. Then, via the reflecting mirror 25 and the angle setting mirror group 23, the deflected beams are applied for scanning in the X direction by the first scanner 5, and are applied for scanning in the Y direction by the second scanner 7.

More specifically, in response to an actuation of the control unit 9, the first scanner 5 and the second scanner 7 are swung in synchronization with the switching timing of the direction of deflection by the deflector 1. Consequently, the beams whose optical paths are switched by the deflector 1 are sequentially applied for scanning to the same range in the X direction by the first scanner 5 with a time interval, and are further applied for scanning in the Y direction by the second scanner 7 at a given speed.

The beams applied for scanning by the first scanner 5 and the second scanner 7 are imaged by the imaging lens 43 via the pupil projection lens 41, and the sample A is irradiated with the beams by the objective lens 45. In this way, the beams are two-dimensionally continuously applied for scanning to the sample A in accordance with the switching timing of the deflector 1.

As a result of such beam scanning on the sample A, fluorescence that is signal light as an optical response occurs inside of the sample A, and is detected by the detection unit 51. If the fluorescence is detected by the detection unit 51, image information of the sample A is restored by the restoration unit 53, and the restoration result is displayed on the display unit 55. Consequently, the image of two-dimensional information or three-dimensional information of the sample A displayed on the display unit 55 enables observation of the sample A.

As described above, with the optical scanning apparatus 10 and the scanning microscope apparatus 100 according to the present embodiment, the optical scanning apparatus 10 can two-dimensionally apply for scanning a beam with which the sample A is irradiated by the observation optical system 40, to the sample A at an improved scanning speed. Accordingly, the observation range of the sample A can be observed with a shortened time on the basis of the light from the sample A detected by the detection unit 51.

In the present embodiment, the angle setting unit 22 is described as an example. Alternatively, the mirror array 3 according to the first embodiment and the angle setting unit 32 according to the modification thereof may be adopted.

Hereinabove, the embodiments of the present invention have been described in detail with reference to the drawings, but specific configurations of the present invention are not limited to these embodiments, and include design changes and the like within a range not departing from the scope of the present invention. For example, the present invention is not particularly limitatively applied to the above-mentioned embodiments and modifications, and may be applied to embodiments obtained by combining these embodiments and modifications as appropriate. Moreover, for example, in the above-mentioned embodiments, a beam is deflected by the deflector 1 while the advancing direction thereof is switched among the four optical paths LA, LB, LC, and LD. Alternatively, the beam may be deflected while the advancing direction thereof is switched among three or less optical paths, and may be deflected while the advancing direction thereof is switched among five or more optical paths.

Thus, an optical scanning apparatus includes: a deflector capable of deflecting an entering laser beam while switching an advancing direction thereof among a plurality of direction at a predetermined switching timing; an angle setting unit including a plurality of angle setting mirrors that are placed at angles different from one another on respective optical paths of the laser beams deflected by the deflector, each of the angle setting mirrors reflecting the laser beam while giving thereto a relative angle on the same plane for each optical path, and gathering the laser beam on the same point; and a swingable mirror that is provided so as to be swingable about an axial line perpendicular to the plane in synchronization with the switching timing, the swingable mirror reflecting each laser beam that is caused by the angle setting unit to enter the same point from a different direction and applying for scanning the laser beam along the same trajectory.

With the optical scanning apparatus, the laser beam is deflected by the deflector while the advancing direction thereof is switched among the plurality of directions at the predetermined switching timing, is reflected on the angle setting mirror (placed for each optical path after the deflection) of the angle setting unit, and is caused to enter the same point of the swingable mirror at a different angle on the same plane. Then, the swingable mirror is swung about the axial line, whereby the laser beam that is sequentially caused for each optical path to enter the swingable mirror is applied for scanning in the mirror arrangement direction.

In this case, the swingable mirror is swung in synchronization with the switching timing of the direction of deflection by the deflector, whereby the laser beams that are caused by the angle setting mirrors to enter the swingable mirror at entrance angles different from one another can be sequentially applied for scanning to a given range with a time interval in accordance with the switching timing of the deflector. Accordingly, if the deflector simply switches the laser beam deflecting direction at high speed, it is possible to improve the scanning speed without decreasing the laser beam use efficiency, compared with the case where a beam splitter branches a laser beam into a plurality of optical paths and where only laser beams that pass through a diaphragm are used.

In the optical scanning apparatus, the angle setting unit includes a plurality of pairs of: a plurality of angle setting mirror groups in which angle settings of the plurality of angle setting mirrors are different from one another; and a plurality of reflecting mirrors that reflect the laser beams deflected by the deflector and cause the laser beams to respectively enter the angle setting mirrors of each angle setting mirror group, and the pairs of the angle setting mirror groups and the reflecting mirrors may be respectively provided at positions different in distance from the swingable mirror so as to be selectively insertable/detachable such that the laser beams reflected on the angle setting mirrors are gathered on the same point of the swingable mirror.

With such a configuration, selectively inserted one of the pairs of the angle setting mirror groups and the reflecting mirrors is changed, whereby the entrance angles of the laser beams to the swingable mirror can be changed in accordance with the angles of the angle setting mirrors. Here, if the swing range of the swingable mirror is changed, the magnifying power on an image of the sample irradiated with the laser beam applied for scanning by the swingable mirror varies. Accordingly, through a simple configuration in which inserted one of the pairs of the angle setting mirror groups and the reflecting mirrors is simply changed so as to suit the swing angle of the swingable mirror, a zoom function using the swingable mirror can be achieved without the need to change a normal deflecting operation of the deflector.

In the optical scanning apparatus, the angle setting unit includes: a plurality of angle setting mirror groups in which angle settings of the plurality of angle setting mirrors are different from one another; and a reflecting mirror that reflects the laser beams deflected by the deflector and causes the laser beams to respectively enter the angle setting mirrors of each angle setting mirror group, the angle setting mirror groups may be respectively provided at positions different in distance from the swingable mirror so as to be selectively insertable/detachable such that the laser beams reflected on the angle setting mirrors are gathered on the same point of the swingable mirror, and the reflecting mirror may be provided on the optical paths of the laser beams from the deflector so as to be movable in a direction along the optical paths and/or swingable about another axial line parallel to the axial line.

With such a configuration, the position and orientation of the reflecting mirror is simply changed so as to suit the position of selectively inserted one of the angle setting mirror groups, whereby the laser beams from the deflector can be caused to enter the swingable mirror at entrance angles suited to the swing angle of the swingable mirror, via the reflecting mirror and the angle setting mirror group. Accordingly, the zoom function using the swingable mirror can be achieved without the need to change the normal deflecting operation of the deflector, while the number of components is reduced.

In the optical scanning apparatus, the angle setting unit includes: an angle setting mirror group in which angles of the angle setting mirrors and distances among the angle setting mirrors are changeable; and a reflecting mirror that reflects the laser beams deflected by the deflector and causes the laser beams to respectively enter the angle setting mirrors of the angle setting mirror group, the angle setting mirror group may be movable in a direction in which the angle setting mirrors and the swingable mirror come closer to or more away from each other, and the reflecting mirror may be provided on the optical paths of the laser beams deflected by the deflector so as to be movable in a direction along the optical paths and/or swingable about another axial line parallel to the axial line.

With such a configuration, the angle setting mirror group is moved in the direction in which the angle setting mirrors and the swingable mirror come closer to or more away from each other, and the angles and positions of the angle setting mirrors are adjusted such that the reflected laser beams are gathered on the same point while relative angles on the same plane are given thereto for each optical path. As a result, the laser beams can be caused to enter the swingable mirror at entrance angles suited to the swing angle of the swingable mirror. Accordingly, the magnifying power on an image of the sample can be varied by changing the swing angle of the swingable mirror.

In the optical scanning apparatus, the reflecting mirror is simply moved in the direction along the optical paths or swung about the another axial line on the optical paths of the laser beams so as to suit the position of the angle setting mirror group, whereby the laser beams from the deflector can be caused to respectively enter the angle setting mirrors of the angle setting mirror group. Accordingly, the zoom function using the swingable mirror can be easily achieved without the need to change the normal deflecting operation of the deflector.

The optical scanning apparatus further includes another swingable mirror that applies for scanning the laser beam applied for scanning by the swingable mirror in a direction orthogonal to a scanning direction of the swingable mirror.

With such a configuration, the laser beams that are continuously applied for scanning to the same range in one direction by one of the swingable mirrors can be sequentially applied for scanning in the direction orthogonal thereto by the other of the swingable mirrors. Accordingly, the two-dimensional scanning speed of the laser beam can be improved.

A scanning microscope apparatus includes: the optical scanning apparatus having any of the above-mentioned features; an observation optical system that irradiates a sample with the laser beam applied for scanning by the optical scanning apparatus; and a detection unit that detects light from the sample that is irradiated with the laser beam by the observation optical system.

With the scanning microscope apparatus, the optical scanning apparatus can two-dimensionally apply for scanning the laser beam with which the sample is irradiated by the observation optical system, to the sample at an improved scanning speed. Accordingly, the observation range of the sample can be observed with a shortened time on the basis of the light from the sample detected by the detection unit.

The scanning microscope apparatus further includes: a restoration unit that associates the light from the sample detected by the detection unit with a scanning position of the laser beam and restores two-dimensional information or three-dimensional information; and a display unit that displays the two-dimensional information or the three-dimensional information restored by the restoration unit.

With such a configuration, the two-dimensional information or the three-dimensional information of the sample displayed on the display unit enables observation of the sample.

REFERENCE SIGNS LIST 1 deflector
3 mirror array (angle setting unit)
5 scanner (swingable mirror)
10 optical scanning apparatus
13 angle setting mirror
13A, 13B, 13C, 13D angle setting mirror
23, 33 angle setting mirror group
25, 35 reflecting mirror
23A, 23B, 23D angle setting mirror group
25A, 25B, 25D reflecting mirror
40 observation optical system
51 detection unit
53 restoration unit
55 display unit
100 scanning microscope apparatus

The invention claimed is:

1. An optical scanning apparatus comprising:
a deflector capable of deflecting an entering laser beam while switching an advancing direction thereof among a plurality of direction at a predetermined switching timing;
an angle setting unit including a plurality of angle setting mirrors that are placed at angles different from one another on respective optical paths of the laser beams deflected by the deflector, each of the angle setting mirrors reflecting the laser beam while giving thereto a relative angle on the same plane for each optical path, and gathering the laser beam on the same point; and
a swingable mirror that is provided so as to be swingable about an axial line perpendicular to the plane in synchronization with the switching timing, the swingable mirror reflecting each laser beam that is caused by the angle setting unit to enter the same point from a different direction and applying for scanning the laser beam along the same trajectory.

2. The optical scanning apparatus according to claim 1, wherein
the angle setting unit includes a plurality of pairs of: a plurality of angle setting mirror groups in which angle settings of the plurality of angle setting mirrors are different from one another; and a plurality of reflecting mirrors that reflect the laser beams deflected by the deflector and cause the laser beams to respectively enter the angle setting mirrors of each angle setting mirror group, and
the pairs of the angle setting mirror groups and the reflecting mirrors are respectively provided at positions different in distance from the swingable mirror so as to be selectively insertable/detachable such that the laser beams reflected on the angle setting mirrors are gathered on the same point of the swingable mirror.

3. The optical scanning apparatus according to claim 1, wherein
the angle setting unit includes: a plurality of angle setting mirror groups in which angle settings of the plurality of angle setting mirrors are different from one another; and a reflecting mirror that reflects the laser beams deflected by the deflector and causes the laser beams to respectively enter the angle setting mirrors of each angle setting mirror group,
the angle setting mirror groups are respectively provided at positions different in distance from the swingable mirror so as to be selectively insertable/detachable such that the laser beams reflected on the angle setting mirrors are gathered on the same point of the swingable mirror, and
the reflecting mirror is provided on the optical paths of the laser beams from the deflector so as to be movable in a direction along the optical paths and/or swingable about another axial line parallel to the axial line.

4. The optical scanning apparatus according to claim 1, wherein
the angle setting unit includes: an angle setting mirror group in which angles of the angle setting mirrors and distances among the angle setting mirrors are changeable; and a reflecting mirror that reflects the laser beams deflected by the deflector and causes the laser beams to respectively enter the angle setting mirrors of the angle setting mirror group,
the angle setting mirror group is movable in a direction in which the angle setting mirrors and the swingable mirror come closer to or more away from each other, and
the reflecting mirror is provided on the optical paths of the laser beams deflected by the deflector so as to be movable in a direction along the optical paths and/or swingable about another axial line parallel to the axial line.

5. The optical scanning apparatus according to claim 1, further comprising another swingable mirror that applies for scanning the laser beam applied for scanning by the swingable mirror in a direction orthogonal to a scanning direction of the swingable mirror.

6. A scanning microscope apparatus comprising:
the optical scanning apparatus according to claim 1;
an observation optical system that irradiates a sample with the laser beam applied for scanning by the optical scanning apparatus; and
a detection unit that detects light from the sample that is irradiated with the laser beam by the observation optical system.

7. The scanning microscope apparatus according to claim 6, further comprising:
   a restoration unit that associates the light from the sample detected by the detection unit with a scanning position of the laser beam and restores two-dimensional information or three-dimensional information; and
   a display unit that displays the two-dimensional information or the three-dimensional information restored by the restoration unit.

* * * * *